United States Patent
Nakano

(10) Patent No.: US 6,801,399 B2
(45) Date of Patent: Oct. 5, 2004

(54) DISK DEVICE MAGNETIC HEAD SLIDER INCLUDING A CONTACT PAD, A POSITIVE PRESSURE PAD AREA, AND A SQUEEZE PAD AREA

(75) Inventor: Naoki Nakano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 09/956,158

(22) Filed: Sep. 20, 2001

(65) Prior Publication Data

US 2002/0034048 A1 Mar. 21, 2002

(30) Foreign Application Priority Data

Sep. 20, 2000 (JP) ........................................ 2000-286222

(51) Int. Cl.[7] ............................. G11B 5/60; G11B 17/32
(52) U.S. Cl. ............................. 360/236.3; 360/235.6; 360/235.8; 360/236; 360/237
(58) Field of Search ............................. 360/235.4, 235.5, 360/235.6, 235.7, 235.8, 236, 236.1, 236.3, 236.4, 236.5, 236.6, 236.8, 237, 237.1

(56) References Cited

U.S. PATENT DOCUMENTS

| | | | | |
|---|---|---|---|---|
| 5,777,825 A | * | 7/1998 | Dorius | 360/235.6 |
| 5,859,748 A | | 1/1999 | Itoh | 360/246.2 |
| 5,940,249 A | * | 8/1999 | Hendriks | 360/235.6 |
| 6,055,128 A | * | 4/2000 | Dorius et al. | 360/235.8 |
| 6,069,770 A | * | 5/2000 | Cui et al. | 510/175 |
| 6,125,005 A | * | 9/2000 | Lee et al. | 360/236.1 |
| 6,137,656 A | * | 10/2000 | Levi et al. | 360/235.4 |
| 6,144,529 A | * | 11/2000 | Wada et al. | 360/236.1 |
| 6,157,519 A | | 12/2000 | Kohira et al. | 360/245 |
| 6,288,874 B1 | * | 9/2001 | Ito | 360/235.5 |
| 6,333,835 B1 | * | 12/2001 | Kang et al. | 360/235.4 |
| 6,344,949 B1 | * | 2/2002 | Albrecht et al. | 360/236.5 |
| 6,356,412 B1 | * | 3/2002 | Levi et al. | 360/237 |
| 6,396,664 B2 | * | 5/2002 | Koishi et al. | 360/235.8 |
| 6,424,493 B1 | * | 7/2002 | Matsumoto et al. | 360/235.5 |
| 6,445,542 B1 | * | 9/2002 | Levi et al. | 360/236.5 |
| 6,459,546 B1 | * | 10/2002 | Mundt et al. | 360/236.3 |
| 6,515,831 B1 | * | 2/2003 | Sannino et al. | 360/235.6 |
| 6,556,381 B2 | * | 4/2003 | Kohira et al. | 360/236.3 |

FOREIGN PATENT DOCUMENTS

| | | |
|---|---|---|
| JP | 5-74090 | 3/1993 |
| JP | 7-307069 | 11/1995 |
| JP | 8-279132 | 10/1996 |

* cited by examiner

*Primary Examiner*—Jefferson Evans
(74) *Attorney, Agent, or Firm*—Finnegan, Henderson, Farabow, Garrett & Dunner, L.L.P.

(57) ABSTRACT

A magnetic head slider for eliminating the fluctuations of contact forces between a magnetic head and a recording disk due to changes in atmospheric pressure or shocks includes a plurality of fluid force generating faces positioned at a plurality of different height levels. The magnetic head slider includes a positive pressure generation area and a contact pad provided on a top level along the air flow direction due to rotation of the magnetic disk. The contact pad supports the magnetic head. A squeeze pad area is provided at a middle height level between the top level and the low level of the surfaces to traverse the low level of the surfaces for suppressing fluctuations of contact forces between the magnetic head and the magnetic disk medium.

13 Claims, 14 Drawing Sheets

A – A

Surface A

Surface B

Surface C

DISK DEVICE MAGNETIC HEAD SLIDER INCLUDING A CONTACT PAD, A POSITIVE PRESSURE PAD AREA, AND A SQUEEZE PAD AREA

BACKGROUND OF THE INVENTION

1. Field of the Invention

The invention relates to a magnetic disk memory device, and more particularly, to a head contact type magnetic disk memory device having a novel magnetic head slider for providing stable head contact to a disk surface, while keeping low loading during recording and reproducing operations.

2. Description of the Related Art

Recently, a head contact-type magnetic disk memory device has been developed in order to increase recording density on a magnetic disk. The head contact-type magnetic disk memory device includes a magnetic head slider for sliding on a surface of a magnetic disk, and for bringing a magnetic head into contact with the disk surface during recording and reproducing operations.

Usually, the magnetic head slider has a slider surface facing a disk surface. During recording and reproducing operations, the slider surface is subject to air pressure caused by fluid dynamic pressure effects due to relative motions between the head slider and the rotating disk surface. In order to utilize the air pressure effects during the rotation of the magnetic disk, a portion of the head slider is designed so as to contact the disk surface as a result of the air pressure during recording and reproducing operations. Usually, a back end portion of the slider surface along a forward-moving direction of the head slider remains in contact with the disk surface.

In order to prevent hard wear on the contact pad to a disk surface, it is necessary to keep low loading during recording and reproducing operations. As illustrated in FIG. 17, assuming that a head slider 100 has a contact pad at an air flow outlet edge and a positive pressure generating part, a contact force is fc, the suspension load is F, a positive pressure is fn, a distance between fc and F is lg, and a distance between fc and fn is ln, the following formula applies:

$$fc = (lh - lg)/lh \times F$$

In order to realize the smaller contact force, a configuration of the magnetic head slider is proposed as illustrated in FIGS. 18A and 18B. The head slider 100 includes a positive pressure generating part 106 at an air flow inlet edge and a contact pad 107 that generates almost no positive pressure at an air flow outlet edge. The suspension load position is almost the same with the positive pressure generating part 106. A positive pressure on the positive pressure generating part 106 is almost the same with the suspension load F, and almost no positive pressure is generated on the contact pad in this configuration. Consequently, this configuration has a short distance ln–lg, and a long distance ln, so that the small contact force is achieved.

As illustrated in FIGS. 18A and 18B, both the positive pressure generating part 106 and the contact pad 107 are positioned at a top surface A of the head slider. Namely, the surface A of the slider is the closest to the facing disk surface. Each of the surfaces A, B and C of the head slider has a different height relative to the disk surface. But such a small contact pad has no cushion effect by air-bearing forces against shocks during a head loading operation. Consequently, the contact pad hits hard on the disk surface and is worn by hits in a head loading operation.

The head contact-type magnetic disk memory devices are usually installed in handheld devices, such as notebook-type personal computers. To apply the head contact-type magnetic disk memory device in a handheld computer, it is desirable that stable head loading and unloading operations be performed along with restricted fluctuations of the contact force of the magnetic head caused by shocks to the computer. Thus, it is desirable to keep a stable contact between the head slider and the magnetic disk with a low load. Further, it is needed for the computer use to enhance the suppression of contact force fluctuations on the slider caused by changes in atmospheric pressure.

SUMMARY OF THE INVENTION

Therefore, there is a need for providing a head contact-type magnetic disk device having a novel magnetic head slider that can perform a stable head contact to a magnetic disk with a low load in order to restrict the variations of the head slider contact forces.

In order to overcome the above-mentioned problems and disadvantages of conventional devices, the invention provides a magnetic head slider having an air flow inlet side, an air flow outlet side, and a plurality of surfaces between the inlet side and the outlet side for constituting fluid force generating parts for the magnetic head slider, due to dynamic pressure effects of the air flow accompanying rotation of the magnetic recording medium. Each of the plurality of surfaces has a different height level for respectively defining a different distance to a surface of the magnetic recording medium. The magnetic head slider comprises: a contact pad for supporting a magnetic head for recording and reproducing data to and from a magnetic recording medium, so as to make the magnetic head contact the surface of the magnetic recording medium. The contact pad is provided around the air flow outlet side at a top level in the plurality of different height levels. A positive pressure pad area is provided around the air flow inlet side for generating positive pressure during rotation of the magnetic recording medium, and the positive pressure pad area is positioned so as to keep the same top level of the contact pad. A squeeze pad area is also provided for suppressing fluctuations of contact forces between the magnetic head and the magnetic disk medium, and the squeeze pad area is provided along the air flow direction at a middle height level between the top level and the low level of the surfaces so as to cross the low level of the surfaces.

BRIEF DESCRIPTION OF THE DRAWINGS

A more complete appreciation of the present invention and many of the advantages thereof will be better understood by reference to the following detailed description, when considered in connection with the accompanying drawings.

FIGS. 14A–14D explain the squeeze film effect by the magnetic head slider shown in FIG. 13, wherein FIG. 14B illustrates section 14B—14B of FIG. 14A and FIG. 14D illustrates section 14D—14D of FIG. 14C.

FIGS. 16A–16D explain the squeeze film effect by the magnetic head slider shown in FIG. 15, wherein FIG. 16B illustrates section 16B—16B of FIG. 16A and FIG. 16D illustrates section 16D—16D of FIG. 16C.

DESCRIPTION OF THE PREFERRED EMBODIMENTS

Figure 2:
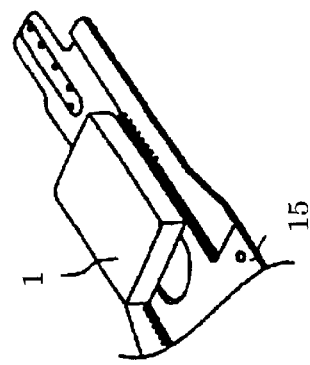
FIG. 2 is an enlarged perspective view of the magnetic head slider in the magnetic disk device illustrated in FIG. 1.

Reference will now be made in detail to embodiments of the present invention, examples of which are illustrated in the accompanying drawings. Wherever possible, the same reference numbers will be used throughout the drawings to identify the same or similar parts.

Embodiments consistent with the present invention are directed to a magnetic head slider and a magnetic disk device including such a slider.

A magnetic head slider consistent with the invention can obtain the squeeze film effect by suppressing the generation of positive pressure, so that the fluctuations of the contact force due to the head slider loading and vibration caused by an impact can be suppressed. Thus a stable contact force between the magnetic head and the information recording medium can be maintained.

Further, a magnetic head slider consistent with the invention additionally has a first negative pressure control area configured to divide the positive pressure generation area. Since a fluid flows in from the first negative pressure control area in the direction of the flow due to rotation of the information recording medium, the generation of negative pressure behind the positive pressure generation area is suppressed, and the contact force of the magnetic head can be achieved independent of the position of the magnetic head in the radial direction of the information recording medium.

Furthermore, a magnetic head slider consistent with the invention has a second negative pressure control area configured to divide the positive pressure generation area and the squeeze pad area. Accordingly, air flow can be introduced from the second negative pressure control area, and the generation of negative pressure, behind the positive pressure generation part in the direction of the flow due to rotation of the information recording medium, can be suppressed.

Further, a magnetic head slider consistent with the invention has a third negative pressure control area configured to be between the second negative pressure control area and the positive pressure generation area.

In a magnetic head slider consistent with the invention, the degrees of freedom of design of the second negative pressure control area are extended and the introduction of air can be controlled more accurately.

Furthermore, a magnetic head slider consistent with the invention is characterized in that the squeeze pad area is arranged on a slant to the direction of the flow due to rotation of the recording medium. Further, for example, simultaneous with a change in the positive pressure in the squeeze pad area at the time of reduction in the atmospheric pressure, the back negative pressure in the direction of the fluid flow due to rotation of the information recording medium is changed, so that the change is suppressed and the change in the contact force of the magnetic head can be prevented.

Further, a magnetic head slider consistent with the invention is characterized in that a forward area and a backward area constituting the squeeze pad area are arranged on a slant in different directions, respectively, from the direction of the flow, due to rotation of the information recording medium.

A magnetic head slider consistent with the invention can suppress generation of positive pressure, increase the area of the squeeze pad area, control a change in the contact force when atmospheric pressure is reduced, and obtain a larger squeeze effect at the same time.

Furthermore, a magnetic disk device consistent with the invention has a magnetic head slider having a loaded magnetic pole element for recording and reproducing data on a recording medium installed so as to rotate freely. The magnetic head slider has a slider part having a surface on which a fluid force, generated by a dynamic pressure effect of the flow due to rotation of the information recording medium, operates, and a contact part for supporting the magnetic pole element so that the surface of the magnetic pole element opposite the information recording medium comes in contact with the information recording medium. A plurality of areas into which the fluid force operating surface of the slider part is divided via a plurality of height level differences has a positive pressure generation area belonging to the top level, together with the contact part which is installed between them, at least across the area belonging to the low level on the inlet side of the flow. This is due to rotation of the information recording medium and a squeeze pad area belonging to the middle level, between the top level and the low level, which is installed along the direction of the flow so as to cross the area belonging to the low level between the positive pressure generation area and the contact part.

Figure 1:
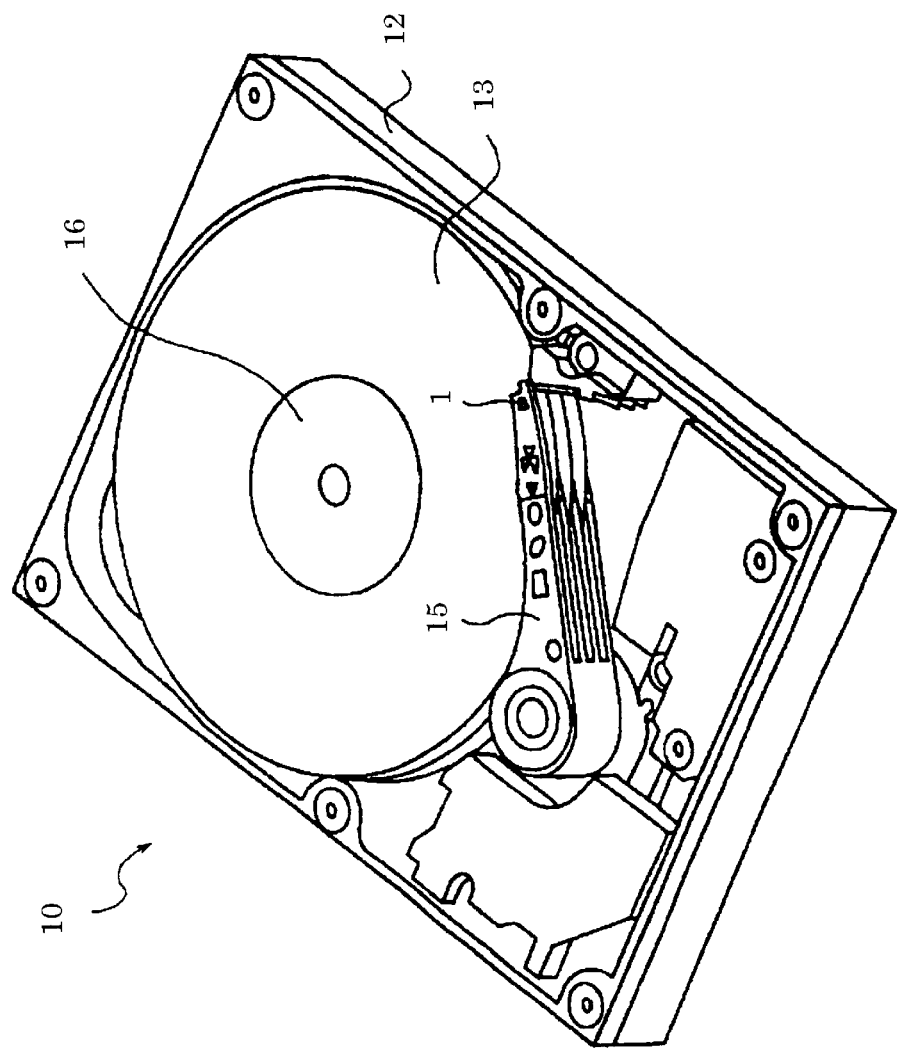
FIG. 1 is a perspective view of a magnetic disk device having a magnetic head slider consistent with the invention.

As illustrated in FIG. 1, a magnetic disk device 10, which is applicable to a magnetic head slider 1 consistent with the invention, includes a base body 12 (a cover is not shown), magnetic disk media provided as a plurality of magnetic disks 13, which are stacked along a spindle motor 16, and a carriage 15 for rotating the magnetic head slider 1 along a radius direction of the disks 13 in order to orient the magnetic head to the recording or reproducing tracks of the disks 13.

As illustrated in FIG. 2, the magnetic head slider 1 is mounted on an end portion of the carriage 15 for supporting a magnetic head element (not shown) facing to a surface of the disk medium.

Figure 3:
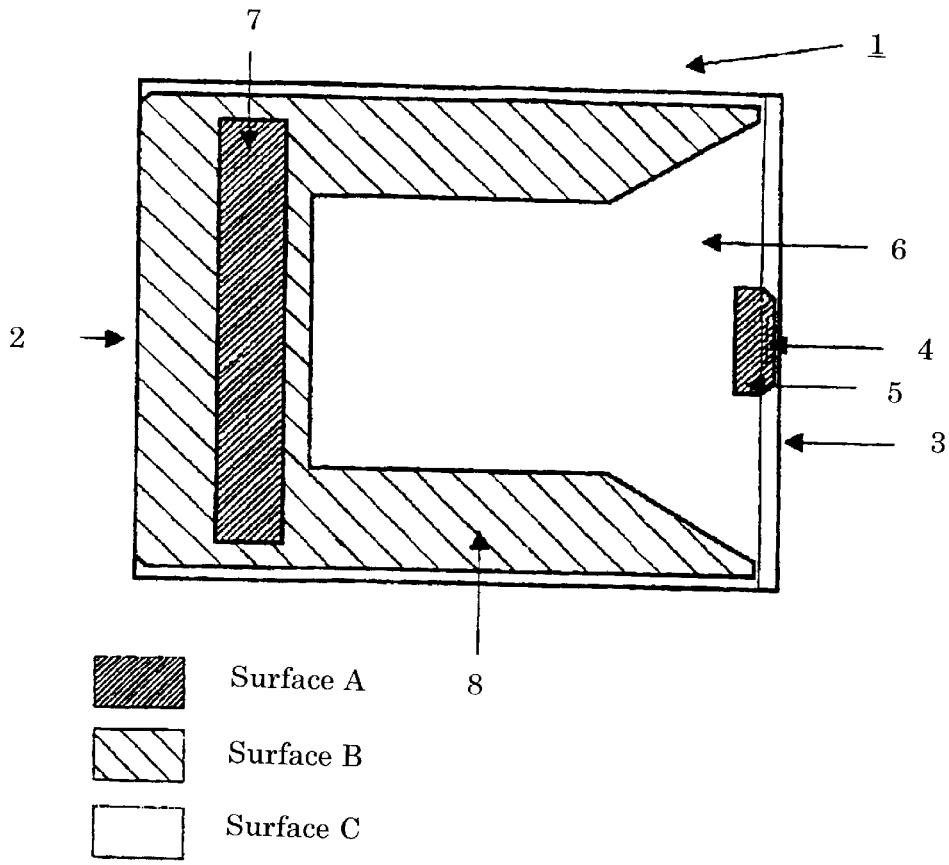
FIG. 3 is a plan view of the magnetic head slider consistent with the invention that is facing toward a magnetic disk.
Figure 4:
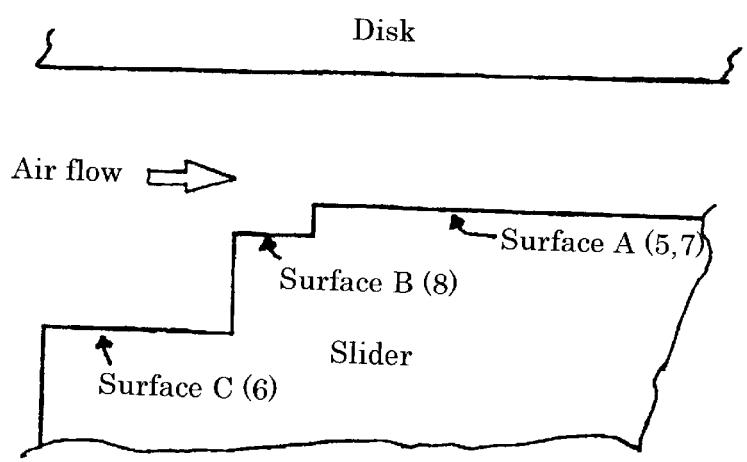
FIG. 4 illustrates a correlation between parts of the magnetic head slider that are respectively shaded in FIG. 3 and each of respective heights of the parts from a disk surface.

With reference to FIGS. 3 and 4, an embodiment of a construction of the magnetic head slider 1 consistent with the invention will be explained. FIG. 3 illustrates the configuration of the magnetic head slider 1 which is viewed from the surface side of the magnetic disk. FIG. 4 explains the correlation of a plurality of different heights to a surface of the magnetic disk, in which the cross hatching of FIG. 3 indicates different heights of the slider surface facing to the magnetic disk.

The magnetic head slider 1 includes an air flow inlet side edge 2 and an air flow outlet side edge 3 accompanying the rotation of the magnetic disk. The magnetic head slider 1 further includes a contact pad 5 provided near the air flow outlet side edge 3 and a positive pressure generating area 7 provided near the air flow inlet side edge 2. As illustrated by the cross hatching in FIG. 3, both the contact pad 5 and the positive pressure generating area 7 are provided at the top level surface A in the slider surface, as illustrated in FIG. 4. The contact pad 5 supports the magnetic head 4 so as to contact a surface of the magnetic head 4 facing to the magnetic disk 13 surface.

Further, the magnetic head slider 1 includes a U-shaped squeeze pad 8 positioned at a middle height level B of the slider surface as illustrated in FIG. 3. The U-shaped squeeze pad 8 includes two side-edge parts extending along the rotational direction of the magnetic disk, i.e., the air flow direction during the rotation of the magnetic disk 13. The U-shaped squeeze pad 8 is provided so as to encircle a low surface area 6 positioned between the contact pad 5 and the positive pressure generating pad area 8.

Thus, as illustrated above, both the contact pad 5 and the positive pressure generating area 7 are provided on a surface positioned at the top level A in the head slider surface, and the U-shaped squeeze pad area 8 is provided on a surface positioned at the middle level B in the head slider surface, positioned between the top level A and the low level C.

These differences in the height levels on the slider surface, in order to place the different elements at different height levels, i.e., both the contact pad 5 and the positive pressure generating area 7 positioned at the top level surface A, the U-shaped squeeze pad 8 at the middle level surface B, and the surface area 6 at the low level surface C, are designed so as to constitute a fluid force generating part for the head slider 1, due to the dynamic pressure effect of the air flow during the rotation of the magnetic disk 13.

As illustrated in FIG. 4, the middle level surface B on the slider surface is closer to the top level surface A than to the low level surface C on the slider surface. By providing the squeeze pad 8 in the magnetic head slider 1 at a position closer to the facing surface of the magnetic disk 13, the magnetic head slider 1 can suppress the fluctuations of the contact force between the magnetic disk surface and the magnetic head surface by utilizing the squeeze film effect generated by the squeeze pad 8. Thus, the squeeze pad 8 generates repulsion forces against the sliding air film force between the magnetic disk 13 and the magnetic head slider 1.

Generally, when a surface of the slider head is positioned close to the disk surface, a positive pressure is generated to the slider head. Accordingly, when a lot of surfaces are positioned closer to the disk surface, a large amount of positive pressure causes a disturbance in the stable contact force between the head slider and the disk surface.

However, the configuration of the magnetic head slider 1 avoids the generation of a large amount of positive pressure, since the squeeze pad 8 is provided at the middle level surface B of the head slider so as to obtain a squeeze effect. Thus, the configuration of the magnetic head slider 1 can obtain the squeeze effect by restricting the generated positive pressure.

Accordingly, it becomes possible to perform a stable loading and unloading of the head slider 1. Further, it becomes possible to restrict the contact variations caused by shocks added to the magnetic disk device when the atmospheric pressure decreases. Accordingly, it becomes possible to maintain a stable contact force of the magnetic head 4 against the magnetic disk.

According to the configuration of the U-shaped squeeze pad 8 in the magnetic head slider 1 of an embodiment consistent with the invention, a negative pressure is generated in the surface area 6 surrounded by the positive pressure generating part 7 and the squeeze pad 8. The negative pressure is dependent upon the air flow speed. Accordingly, the positioning differences of the magnetic head 4 in a radial direction of the magnetic disk 13 causes it to generate fluctuations in the contact force between the magnetic head 4 and the magnetic disk 13 along the radial direction of the disk. Consequently, it is desirable to restrict the generation of the negative pressure in order to maintain stable contact to the disk with a smaller contacting force.

Figure 5:
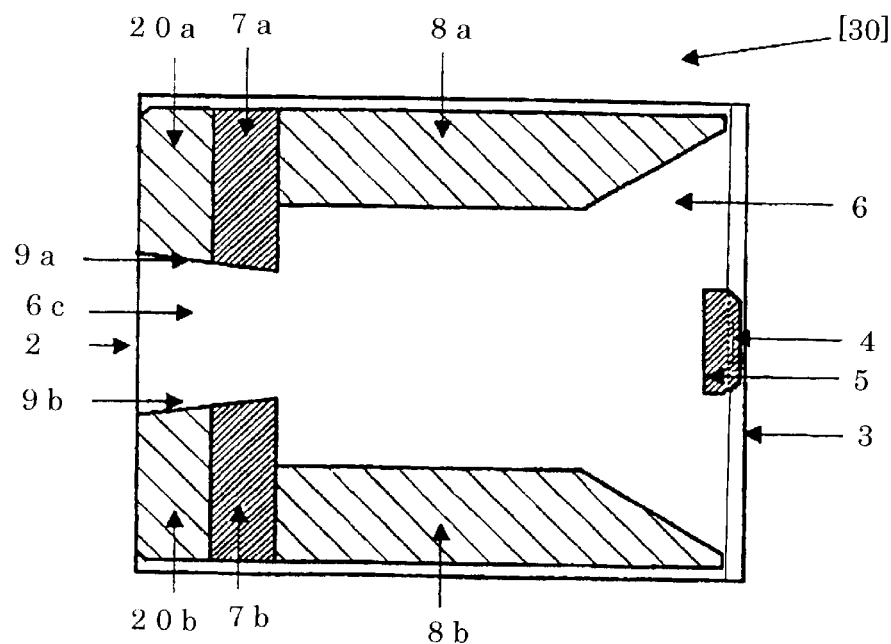
FIG. 5 is a plan view illustrating the magnetic head slider configuration consistent with embodiments of the invention.

FIG. 5 illustrates a magnetic head slider 30 consistent with the invention that includes a variation of the configuration of the magnetic head slider 1 illustrated in FIG. 3. As illustrated in FIG. 5, in the configuration of the magnetic head slider 30, the positive pressure generating area is divided into two areas 7a and 7b, and the squeeze pad is also divided into two parts 20a and 20b so as to form a first negative pressure controlling area 6c between the divided pairs of parts 7a–20a, and 7b–20b. Consequently, the squeeze pad is also provided at the middle level B in the form of the divided two parts 8a and 8b. Thus, in the magnetic head slider 30, the first negative pressure controlling area 6c is provided between the divided squeeze pads 20a and 20b so as to divide the positive pressure generating area along the air flow direction, i.e., a direction from the air flowing-inlet end 2 to the air flowing-outlet end 3, during the rotation of the magnetic disk 13.

Accordingly, the configuration of the magnetic head slider 30, having the first negative pressure controlling area 6c, can restrict the generation of the negative pressure behind the positive pressure generation areas 7a and 7b. Consequently, it can obtain a stable contact force for the magnetic head 4 along a radial direction of the magnetic disk.

As illustrated in FIG. 5, the first negative pressure controlling area 6c is constructed so as to have a pair of tapered air flow controlling walls 9a and 9b along the air flow direction during the rotation of the magnetic disk. The tapered air flow controlling walls 9a and 9b are provided so as to make the negative pressure controlling area 6c gradually narrower along the direction of the air flow outlet side.

Consequently, it becomes possible to restrict the generation of the negative pressure behind the positive pressure generating areas 7a and 7b by compressing the air flow behind the positive pressure generating areas 7a and 7b.

Figure 6:
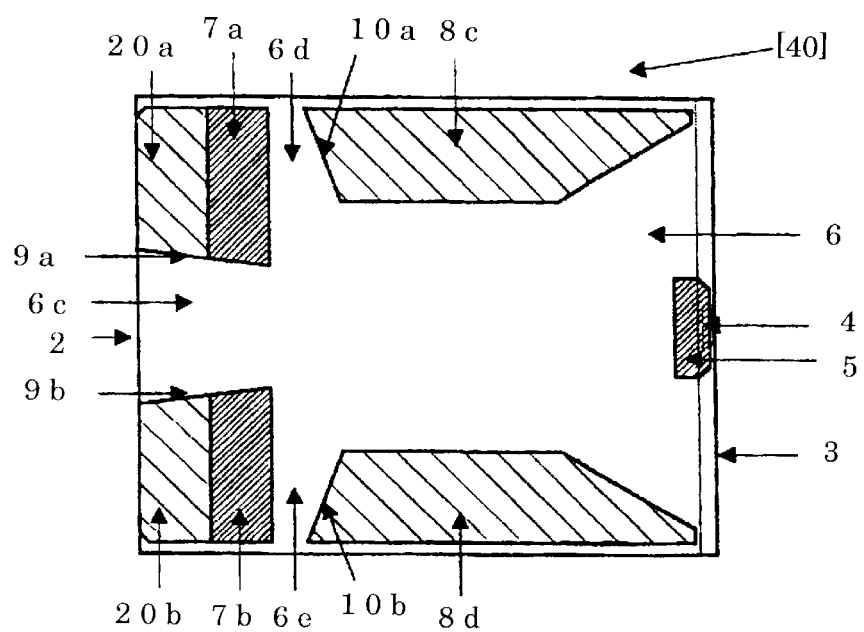
FIG. 6 is a plan view illustrating the magnetic head slider configuration consistent with embodiments of the invention.

FIG. 6 illustrates a magnetic head slider 40 consistent with the invention that includes another variation of the configuration of the magnetic head slider 1 illustrated in FIG. 3. The magnetic head slider 40 includes second negative pressure controlling areas 6d and 6e, provided between each of the divided positive pressure generating areas 7a and 7b and the divided squeeze pads 8c and 8d. Thus, the respective second negative pressure control areas are provided so as to divide the positive pressure generation areas and the squeeze pad along the air flow direction generated during the rotation of the magnetic disk. Furthermore, each of the second negative pressure control areas 6d and 6e is formed to have a tapered air flow-in controllers 10a and 10b in order to adjust the air flow-in rate.

According to this configuration of the magnetic head slider, it becomes possible to restrict the generation of negative pressure behind the positive pressure generating areas 7a and 7b by introducing air flow through the second negative pressure controlling areas 6d and 6e.

Figure 7:
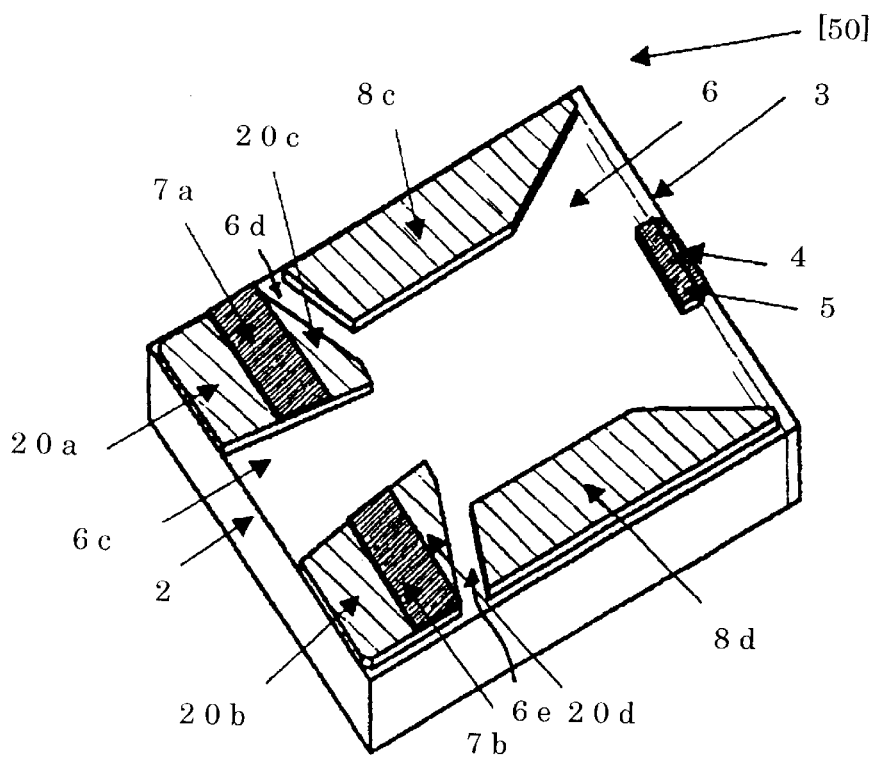
FIG. 7 is a perspective view illustrating the magnetic head slider configuration consistent with embodiments of the invention.
Figure 8:
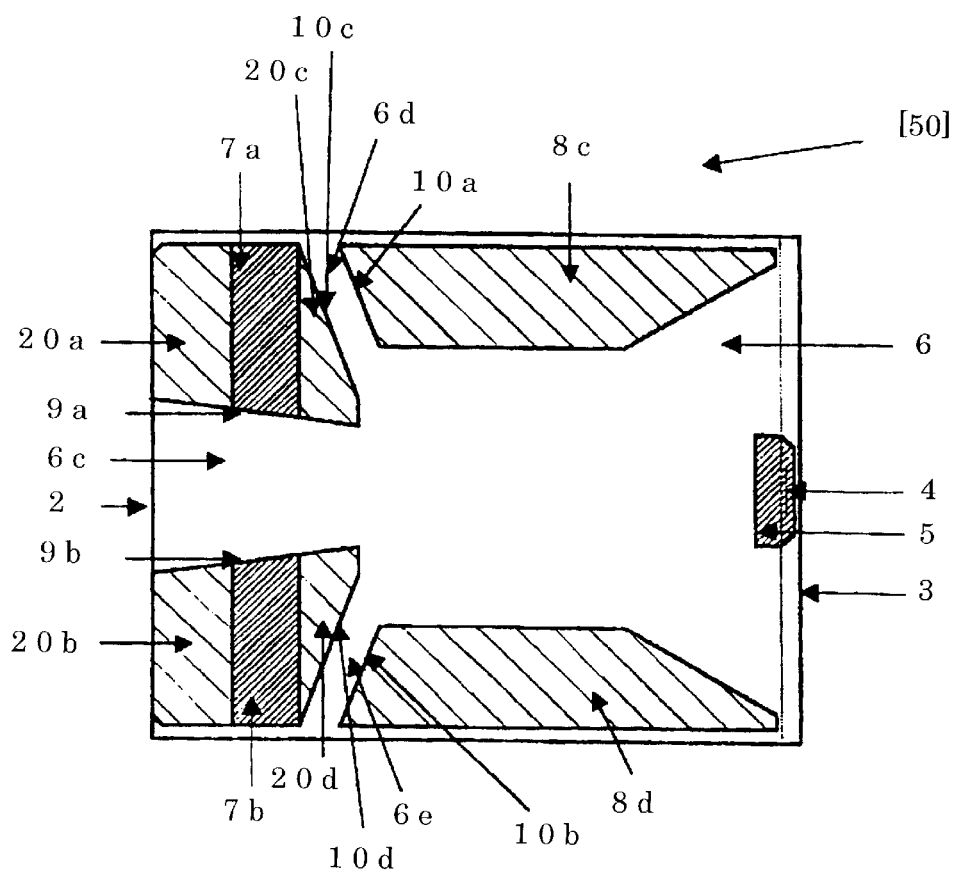
FIG. 8 is a plan view of the magnetic head slider illustrated in FIG. 7.

FIGS. 7 and 8 illustrate a magnetic head slider 50 consistent with the invention that includes another variation of the configuration of the magnetic head slider 1 illustrated in FIG. 3. The magnetic head slider 50 includes third negative pressure controlling areas 20c and 20d behind the positive pressure generation areas 7a and 7b along the air flow direction. The third negative pressure controlling areas 20c and 20d are formed between the positive pressure generation areas 7a and 7b and the second negative pressure controlling areas 6d and 6e, such that the areas 6d and 6e are at the height of surface C, and the areas 7a and 7b are at the height of surface A. Further, each of the second negative pressure controlling areas 6d and 6e is formed to have a tapered air flow-in control structures 10c and 10d for adjusting the air flow-in rate, respectively.

According to these structures of the head slider 50, the degrees of freedom of designing the second negative pressure control areas 6d and 6e are expanded. Consequently, it becomes possible to more accurately control the air flow-in. Thus, it becomes possible for the magnetic head slider 50 to obtain more stable contact force on the magnetic head 4 against the air flow speed.

Figure 9A:
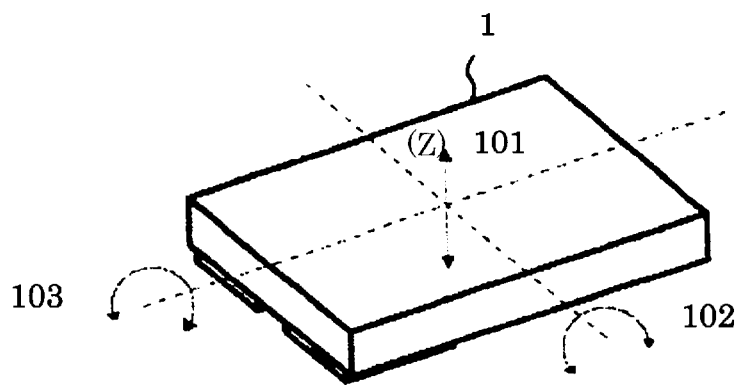
FIGS. 9A–9D illustrate postures of the magnetic head slider illustrated in FIG. 7 when the slider is subject to a fluid dynamic pressure.

FIGS. 9A–9D to 12 illustrate the fluid dynamic pressure operation of magnetic head sliders consistent with the invention. As illustrated in FIG. 9A, the magnetic head slider 1, representative of magnetic head sliders consistent with the present invention, has three degrees of freedom, i.e., a translation direction (Z) 101, a pitching direction 102 and a rolling direction 103. Furthermore, the magnetic head slider 1 receives counter forces or counter torques from the air film corresponding to variations of the posture of the head slider.

Figure 9B:
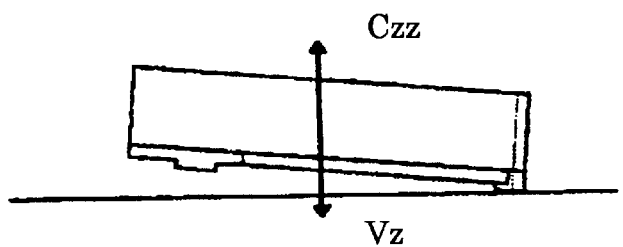
Figure 9C:
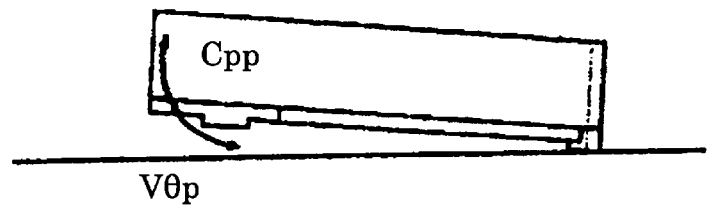
Figure 9D:
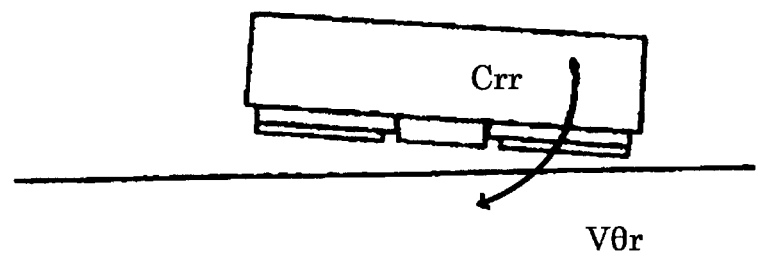

FIG. 9B shows the fluid dynamic pressure operation of the counter force Czz corresponding to variations of speed Vz along the translation direction (Z) 101. FIG. 9C shows the fluid dynamic pressure operation of the counter torque Cpp corresponding to variations of speed Vθp along the pitching direction 102. FIG. 9D shows the fluid dynamic pressure operation of the counter torque Crr corresponding to variations of speed Vθr along the rolling direction 103.

Figure 10:
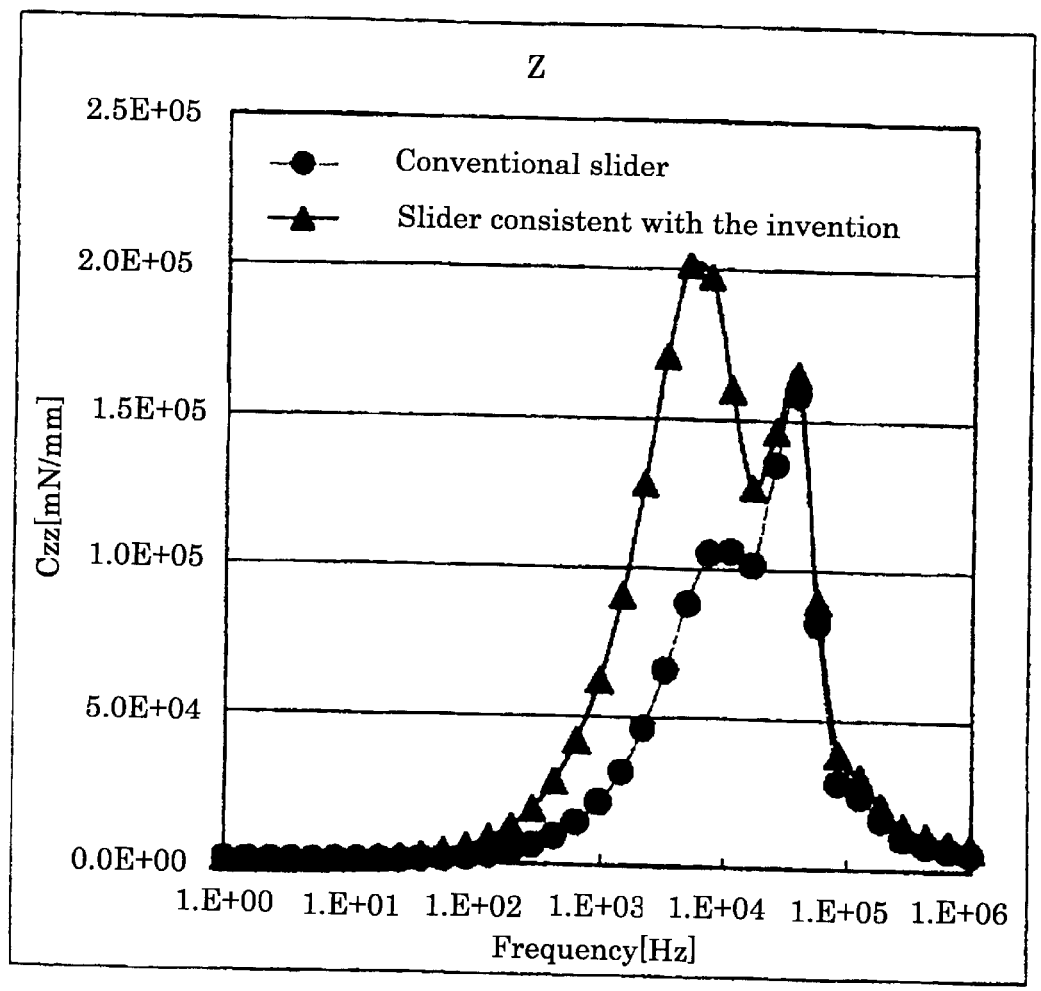
FIG. 10 illustrates the squeeze film effect in a translation direction (Z) for the magnetic head slider shown in FIG. 7.
Figure 11:
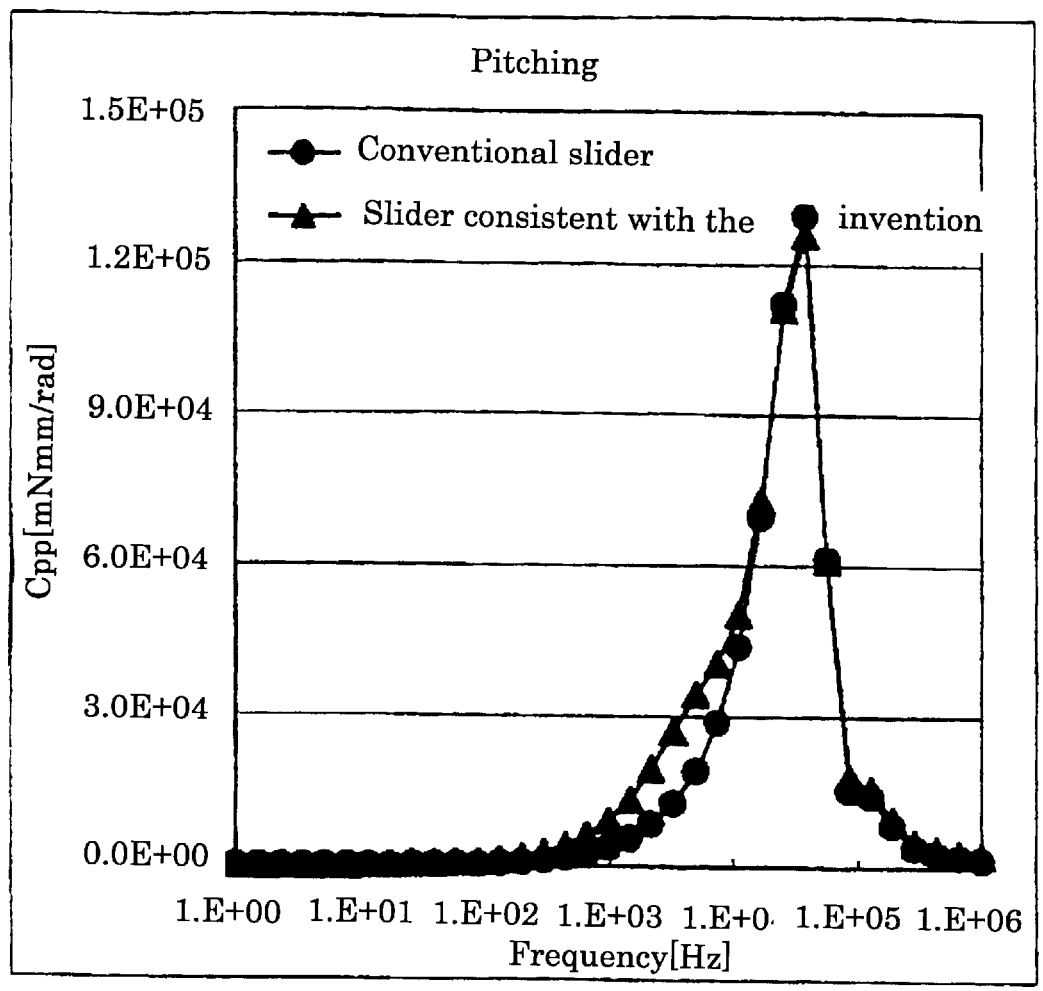
FIG. 11 illustrates the squeeze film effect in a pitching direction for the magnetic head slider shown in FIG. 7.
Figure 12:
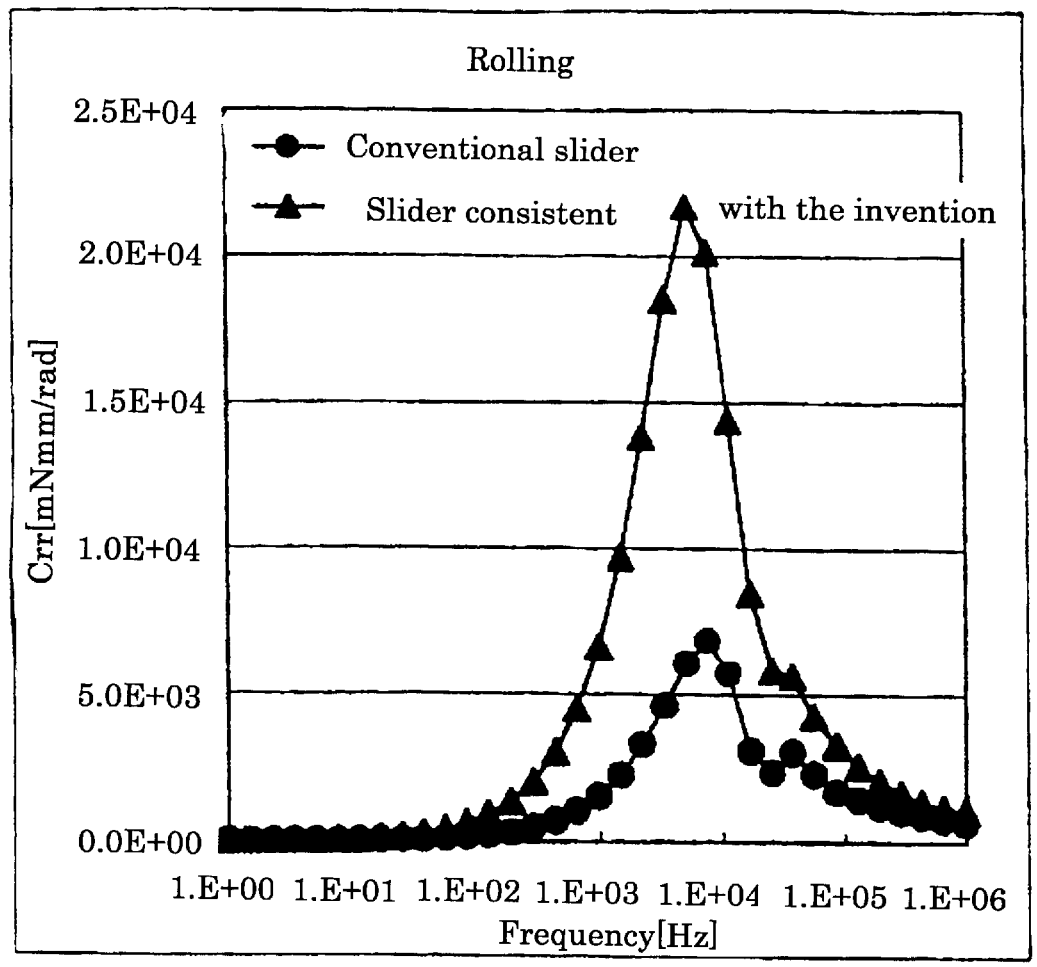
FIG. 12 illustrates the squeeze film effect in the rolling direction for the magnetic head slider shown in FIG. 7.

FIGS. 10–12 show the squeeze film effect due to the counter force or counter torques acting on the magnetic head slider when the magnetic head slider is vibrated with a unit of amplitude at each of frequencies along the translation direction (Z) 101 (FIG. 10), the pitching direction 102 (FIG. 11), and the rolling direction 103 (FIG. 12). The abscissa in each of FIGS. 10–12 indicates vibration frequencies (1 Hz to 1 MHz). The ordinate in FIG. 10 indicates counter forces [mN/mm] acting on the head slider with a unit of amplitude at each vibration along the translation direction (Z) 101. The ordinate in each of FIGS. 11 and 12 indicates counter torques [mNmm/rad] acting on the head slider with a unit of amplitude at each vibration along the pitching direction 102, and the rolling direction 103, respectively.

In FIGS. 10–12, triangle dots show the data for the magnetic head slider consistent with the invention and circle dots show the data of the conventional magnetic head slider such as that shown in FIG. 18. As shown in FIGS. 10–12, the magnetic head slider consistent with the invention receives larger counter forces or counter torques for suppressing the vibration than the conventional magnetic head slider. These results illustrate that the structure of the magnetic head slider consistent with the invention can keep its posture more stably than the conventional head slider structure.

Figure 13:
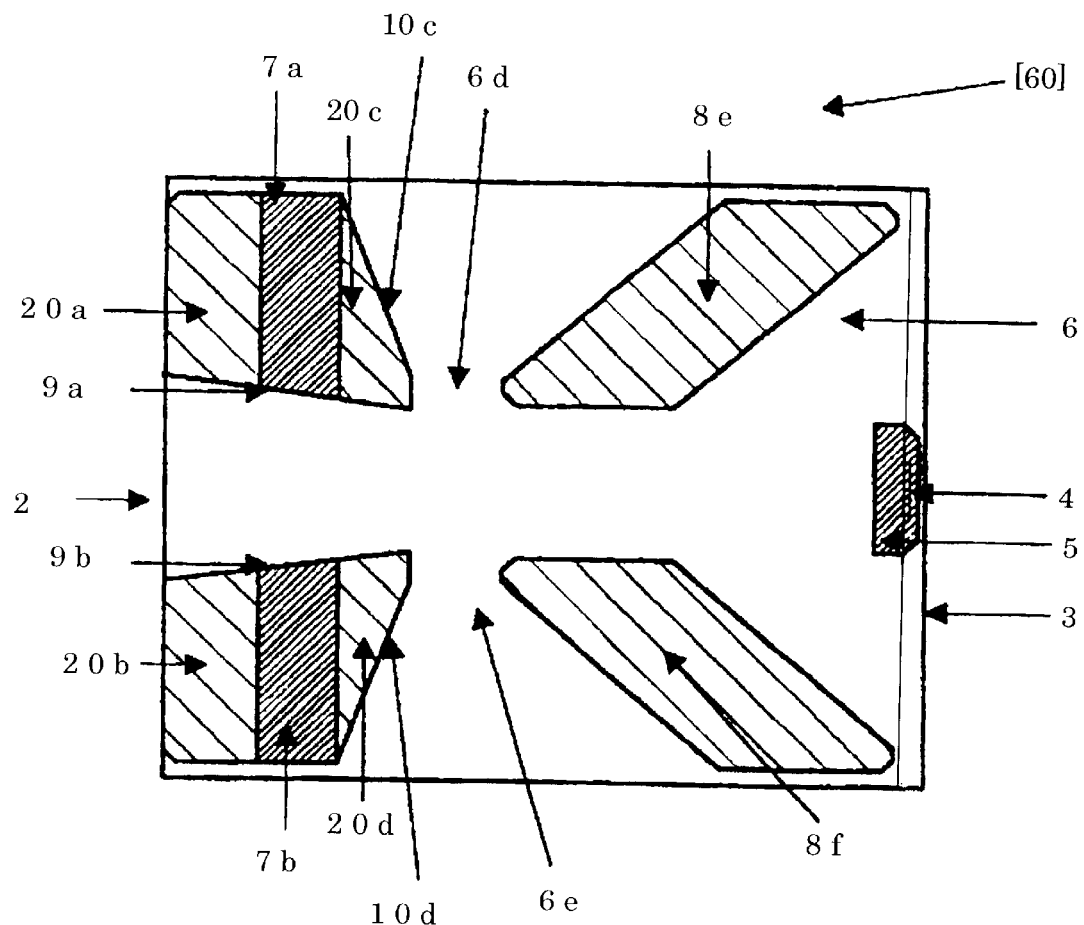
FIG. 13 is a plan view illustrating the magnetic head slider configuration consistent with embodiments of the invention.

FIG. 13 illustrates a magnetic head slider 60 consistent with the present invention that includes a variation of the magnetic head slider 1 illustrated in FIG. 3. The magnetic head slider 60 includes shorter squeeze pad areas 8e and 8f than the squeeze pad areas of the previously described sliders along the rotational direction of the disk. Thus, as illustrated in FIG. 13, the squeeze pad areas 8e and 8f are slanted against a perpendicular direction to the rotational direction of the disk.

The squeeze pad structures of the sliders 1, 30, 40, and 50 may increase the contact forces when the atmospheric pressure is reduced since the squeeze pad area maintains the contact posture of the head slider by compressing the air by its length along the air flow direction due to rotation of the magnetic disk. Consequently, the contact force increases when the atmospheric pressure decreases, since the positive pressure generated on the rear part of the squeeze pad area decreases when the atmospheric pressure decreases.

On the other hand, the magnetic head slider 60 shown in FIG. 13 includes the squeeze pad areas 8e and 8f that are in a slanted shorter form along the rotational direction of the disk. Consequently, the squeeze pad areas 8e and 8f can generate the negative pressures behind them. The negative pressure cancels the positive pressure generated in the squeeze pad areas 8e and 8f. Thus, the structure of this embodiment can prevent the contact force of the magnetic head slider from fluctuating with changes in the negative pressure behind the squeeze pad areas 8e and 8f when the atmospheric pressure is reduced.

Figure 14A:
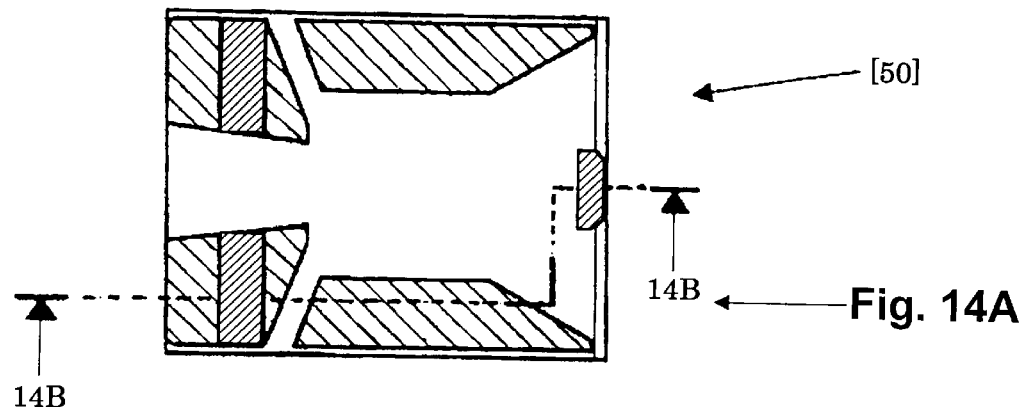
Figure 14B:
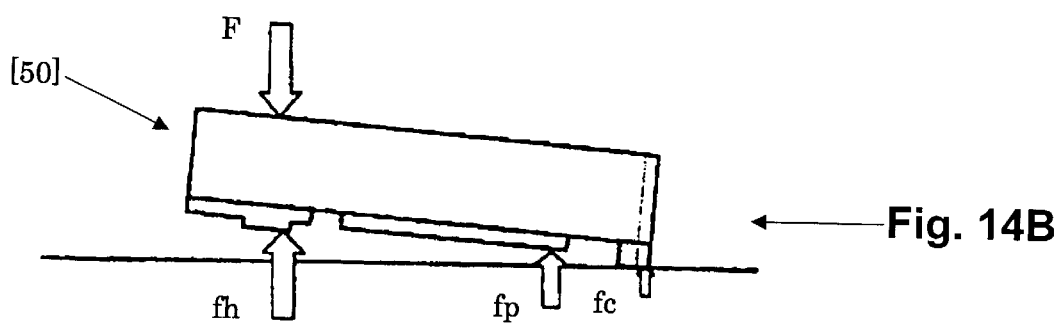

FIGS. 14A–14D compare the fluid dynamic pressure operations of the magnetic head sliders 50 and 60, respectively. As shown in FIGS. 14A and 14B, the head slider 50 receives the force that is comprised of the suspension load F, the fluid force fh, the contact force fc of the magnetic head, and the positive pressure fp generated in the squeeze pad areas. When the atmospheric pressure decreases, the positive pressure fp becomes smaller. Consequently, the contact force fc increases substantially.

Figure 14C:
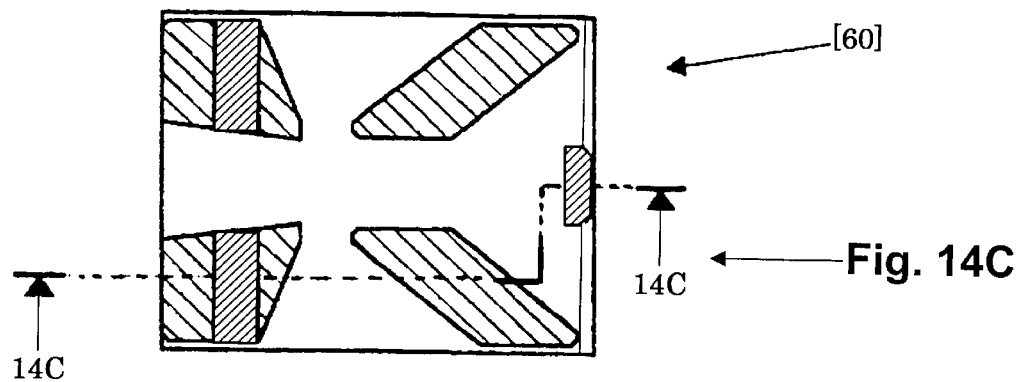
Figure 14D:
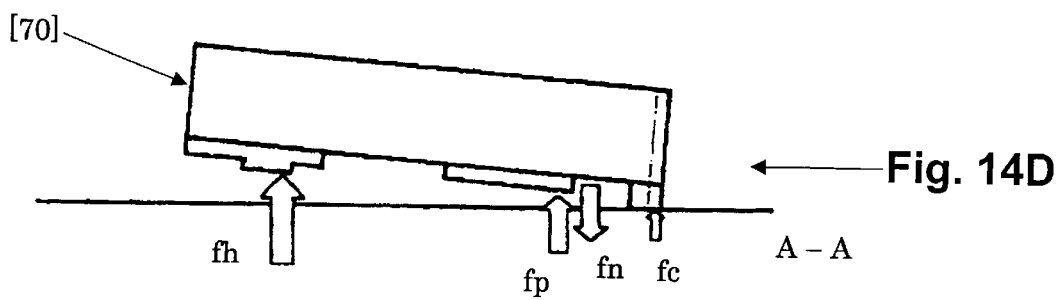

On the other hand, as shown in FIGS. 14C and 14D, in the head slider 60, the squeeze pad has a slant form so as to generate both the positive pressure fp and the negative pressure fn behind the squeeze pad. When the positive pressure fp varies due to reduction of the atmospheric pressure, the negative pressure fn also varies so as to cancel the variations of the positive pressure. Thus, the resultant force operating in the squeeze pad areas is similar to that before the reduction of the atmospheric pressure. Consequently, it becomes possible to restrain the increase of the contact force fc when the atmospheric pressure decreases. Therefore, the magnetic head slider consistent with this embodiment prevents the contact force of the magnetic head from causing fluctuations due to shocks and the atmospheric pressure.

Figure 15:
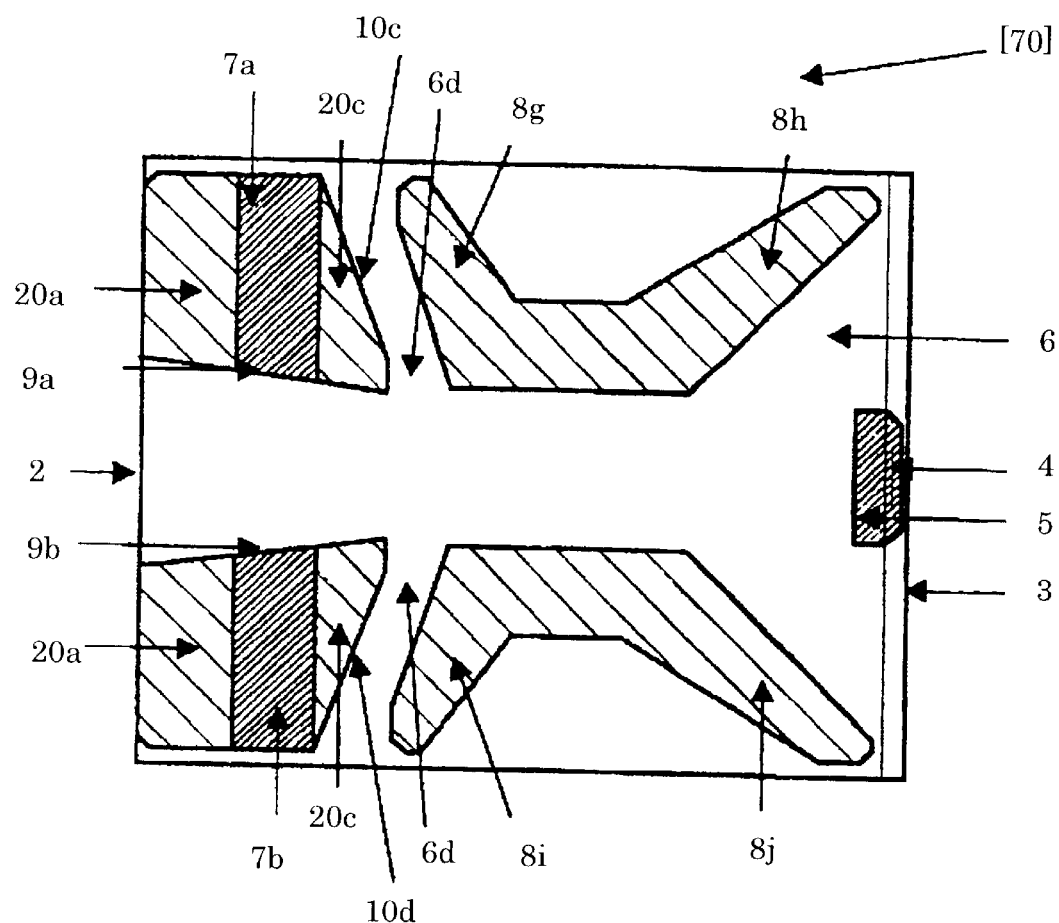
FIG. 15 is a plan view illustrating the magnetic head slider configuration consistent with embodiments of the invention.

FIG. 15 illustrates a magnetic head slider 70 consistent with the present invention that includes a variation of the magnetic head slider 1 illustrated in FIG. 3. The magnetic head slider 70 includes the squeeze pad areas that are shorter than the squeeze pad areas of the sliders 1, 30, 40, and 50, along the rotational direction of the disk. Thus, as illustrated in FIG. 15, one of the squeeze pads has a forward area 8g and a backward area 8h that are inclined in a different direction along the rotational direction of the disk relative to each other. Similarly, the other of the squeeze pads has a forward area 8i and a backward area 8j that are inclined in a different direction along the rotational direction of the disk.

According to this construction, the magnetic head slider 70 has increased squeeze pad areas in order to obtain a larger squeeze effect. Further it can suppress generation of the positive pressure so as to control the variation of the contact force when the atmospheric pressure decreases.

FIGS. 16A–16D compare the fluid dynamic pressure operations of the magnetic head sliders 50 and 70, respectively. The head slider 50 illustrated in FIGS. 16A and 16B receives the force that is comprised of the suspension load F, the fluid force fh, the contact force fc of the magnetic head, and the positive pressure fp generated in the squeeze pad areas. When the atmospheric pressure decreases, the positive pressure fp becomes smaller. Consequently, the contact force fc increases substantially.

Figure 16A:
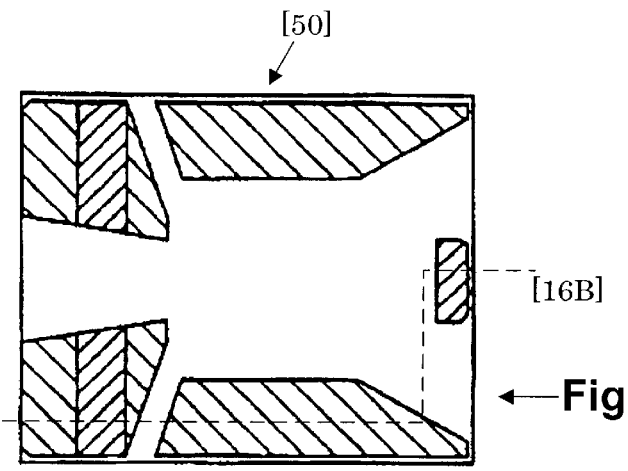
Figure 16B:
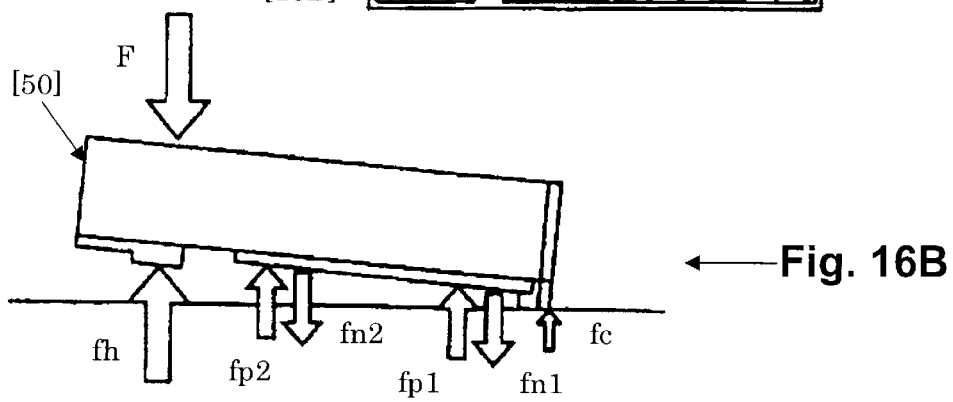
Figure 16C:
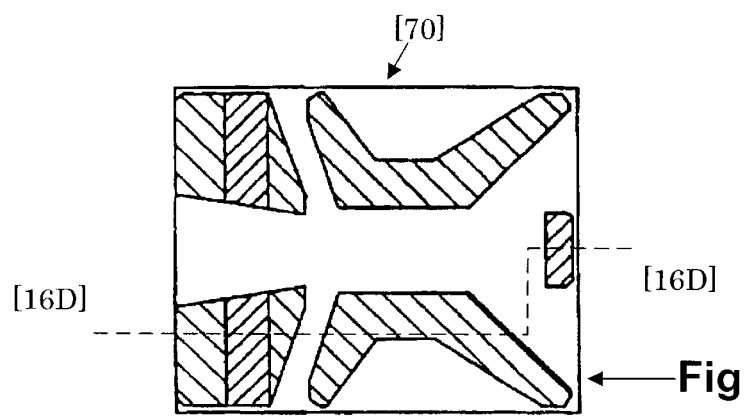
Figure 16D:
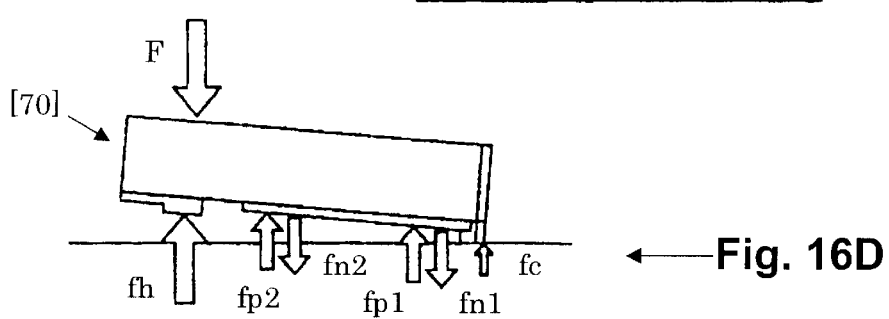
Figure 17:
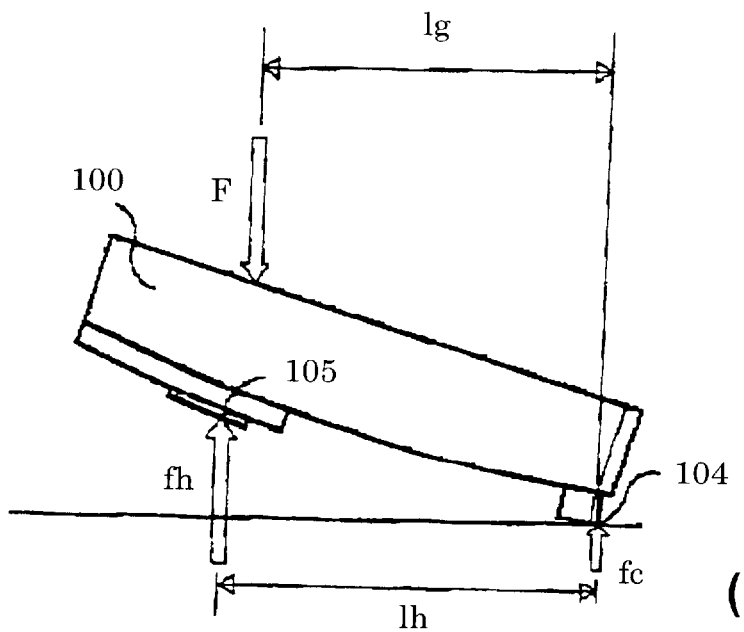
FIG. 17 explains the effect of an inertia force operating on the magnetic head slider caused by an impact.
Figure 18A:
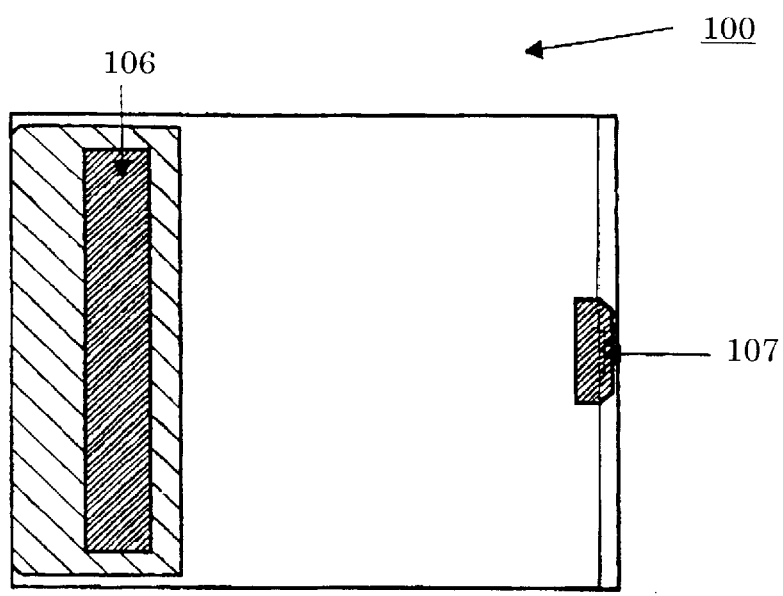
FIGS. 18A and 18B illustrate configurations of a conventional magnetic head slider.
Figure 18A:
Figure 18A:
Figure 18A:
Figure 18B:
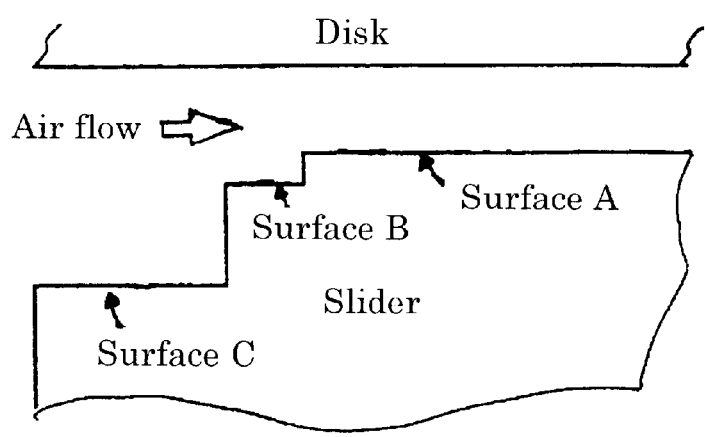

In contrast, the magnetic head slider 70 illustrated in FIGS. 16C and 16D includes the V-shaped squeeze pad areas that have the forward slant areas 8g and 8i, and the backward slant areas 8h and 8j. Thus, the forward slant area and the backward slant area are inclined in a different direction along the rotational direction of the disk so that the squeeze pad areas generate the negative pressures fn1 and fn2 behind the positive pressures fp1 and fp2, so as to cancel them. Consequently, the magnetic head slider 70 can reduce the variations of the contact force fc of the magnetic head when the atmospheric pressure decreases.

As explained above, a magnetic head slider consistent with the invention can suppress fluctuations of contact forces of the magnetic head to a magnetic disk surface due to variations of the atmospheric pressure or impacts to the magnetic disk memory device. Consequently, a stable head loading in a head contact type magnetic disk memory device is realized.

It will be apparent to those skilled in the art that various modifications and variations can be made in the context of the present invention and in its practice without departing from the scope or spirit of the invention.

What is claimed is:

1. A magnetic head slider having an air flow inlet side, an air flow outlet side, and a plurality of surfaces between the inlet side and the outlet side for constituting fluid force generating parts for the magnetic head slider due to dynamic pressure effects of air flow accompanying rotation of a magnetic recording medium, each of the plurality of surfaces having a different height level for defining a different distance to a surface of the magnetic recording medium, the magnetic head slider comprising:

a contact pad supporting a magnetic head for recording and reproducing data to and from a magnetic recording medium to enable the magnetic head to contact the surface of the magnetic recording medium, the contact pad being provided near the air flow outlet side at a top level of the plurality of height levels, and the contact pad being surrounded by a surface being positioned at a lower position of a middle level of the plurality of height levels;

a positive pressure pad area provided near the air flow inlet side, the positive pressure pad area being positioned at the top level; and a squeeze pad area provided along an air flow direction on both sides of the head slider at the middle level, the squeeze pad having a sufficient surface area for having a squeezing effect behind a moving direction of the head slider, and a distal end of the squeeze pad area reaches near a trailing edge in order to obtain a squeeze film effect for avoiding shocks at a loading time.

2. The magnetic head slider according to claim 1, wherein the squeeze pad area is connected to the positive pressure pad area, the whole shape of the positive pressure pad area and the squeeze pad area having a U-shaped configuration.

3. The magnetic head slider according to claim 1, wherein the positive pressure generation area is divided into two parts by a first negative pressure control area.

4. The magnetic head slider according to claim 3, wherein both the positive pressure pad area and the squeeze pad area are collectively divided into two parts by a second negative pressure control area.

5. The magnetic head slider according to claim 4, further comprising:

a third negative pressure control area between the second negative pressure control area and the positive pressure generation area.

6. The magnetic head slider according to claim 1, wherein the squeeze pad area is arranged on a slant along the air flow direction due to rotation of the magnetic recording medium.

7. The magnetic head slider according to claim 1, wherein the squeeze pad area includes a forward area and a backward area along the air flow direction, each of the forward area and the backward area of the squeeze pad being arranged in different slant directions, respectively, along the air flow direction due to rotation of the magnetic recording medium.

8. A magnetic disk memory device, comprising:

a magnetic head for recording and reproducing data to and from a disk medium;

a magnetic head slider for supporting the magnetic head to contact a surface of the disk medium; and a carriage for supporting and rotating the magnetic head slider along a radial direction of the disk medium in order to locate the magnetic head to a target recording or reproducing track of the disk medium;

wherein the magnetic head slider has an air flow inlet side, an air flow outlet side, and a plurality of surfaces between the inlet side and the outlet side for constituting fluid force generating parts for the magnetic head slider due to dynamic pressure effects of air flow accompanying rotation of a magnetic recording medium, each of the plurality of surfaces having a different height level for defining a different distance to a surface of the magnetic recording medium;

the magnetic head slider including:

a contact pad supporting a magnetic head for recording and reproducing data to and from the magnetic recording medium to enable the magnetic head to contact the surface of the magnetic recording medium, the contact pad being provided near the air flow outlet side at a top level of the plurality of different height levels, a positive pressure pad area provided near the air flow inlet side, the positive pressure pad area being positioned at the top level, and a squeeze pad area provided along an air flow direction on both sides of the head slider at a middle height level between the top level and a low height level of the plurality of height levels wherein a distal end of the squeeze pad area reaches near a trailing edge in order to obtain a squeeze film effect for avoiding shocks at a loading time, wherein the squeeze pad area is connected to the positive pressure pad area, and the whole shape of the positive pressure pad area and the squeeze pad area has a U-shaped configuration.

9. The magnetic disk memory device according to claim 8, wherein the positive pressure pad area is divided into two parts by a negative pressure control area.

10. The magnetic disk memory device according to claim 8, wherein the squeeze pad area is arranged on a slant along the air flow direction due to rotation of the disk medium.

11. The magnetic disk memory device according to claim 8, wherein the squeeze pad area includes a forward area and a backward area along the air flow direction, each the forward area and the backward area of the squeeze pad being arranged on a different slant directions, respectively, along the air flow direction due to rotation of the magnetic recording medium.

12. A magnetic disk memory device, comprising:
   a magnetic head for recording and reproducing data to and from a disk medium;
   a magnetic head slider for supporting the magnetic head to contact a surface of the disk medium; and
   a carriage for supporting and rotating the magnetic head slider along a radial direction of the disk medium in order to locate the magnetic head to a target recording or reproducing track of the disk medium;
   wherein the magnetic head slider has an air flow inlet side, an air flow outlet side, and a plurality of surfaces between the inlet side and the outlet side for constituting fluid force generating parts for the magnetic head slider due to dynamic pressure effects of air flow accompanying rotation of a magnetic recording medium, each of the plurality of surfaces having a different height level for defining a different distance to a surface of the magnetic recording medium;
   the magnetic head slider including:
      a contact pad supporting a magnetic head for recording and reproducing data to and from the magnetic recording medium to enable the magnetic head to contact the surface of the magnetic recording medium, the contact pad being provided near the air flow outlet side at a top level of the plurality of different height levels,
      a positive pressure pad area provided near the air flow inlet side, the positive pressure pad area being positioned at the top level, and
   a squeeze pad area provided along an air flow direction on both sides of the head slider at a middle height level between the top level and a low height level of the plurality of height levels wherein a distal end of the squeeze pad area reaches near a trailing edge in order to obtain a squeeze film effect for avoiding shocks at a loading time, wherein both the positive pressure pad area and the squeeze pad area are collectively divided into two parts by a first negative pressure control area.

13. The magnetic disk memory device according to claim 12, comprising:
   a third negative pressure control area installed between a second negative pressure control area and the positive pressure generation area.

* * * * *

UNITED STATES PATENT AND TRADEMARK OFFICE
CERTIFICATE OF CORRECTION

PATENT NO. : 6,801,399 B2
DATED : October 5, 2004
INVENTOR(S) : Nakano

It is certified that error appears in the above-identified patent and that said Letters Patent is hereby corrected as shown below:

Column 11,
Line 17, change "directions," to -- direction, --.

Column 12,
Line 28, change "12, comprising:" to -- 12, further comprising: --.

Signed and Sealed this

Fourth Day of January, 2005

JON W. DUDAS
*Director of the United States Patent and Trademark Office*